ated Nov. 4, 1969

3,476,589
GLASS FIBERS SIZED WITH POLYPHENYLENE
OXIDE DERIVATIVES
Thomas Raphael, Winchester, Mass., and William C. Johnson, Palo Alto, Calif., assignors, by mesne assignments, to General Electric Company, Schenectady, N.Y., a corporation of New York
No Drawing. Filed Oct. 22, 1965, Ser. No. 502,554
Int. Cl. C03c 25/02
U.S. Cl. 117—126                9 Claims

ABSTRACT OF THE DISCLOSURE

Fibrous glass sized with a quaternary ammonium halide derivative of a polyphenylene oxide, an impregnated fibrous glass material formed therefrom and a method for its formation. The quaternary ammonium halide derivative of the polyphenylene oxide provides lubricity between glass strands and increases bond strength between the fibrous glass and a plastic impregnant. The process for the formation of the impregnated fibrous glass material involves coating fibrous glass with the quaternary ammonium halide derivatives of the polyphenylene oxide by immersing them in a solution thereof, immersing the fibrous glass in hot water, and impregnating the fibrous glass with a plastic binder.

---

This invention relates to fibrous glass and articles formed therefrom surface treated with a sizing material which promotes resistance to abrasion and provides a strong bond between glass surfaces and synthetic organic polymeric materials which are employed in combination with the glass fibers in the manufacture of fiber reinforced plastics, laminates, coated fabrics and the like.

Many uses have been developed for glass fibers. However, there are various disadvantages associated with their use. One such disadvantage relates to the breaking or fracturing of glass fibers due to abrasion caused by the glass fibers being in rubbing contact with each other. Another disadvantage, particularly when the fibers are used as a strengthening agent for synthetic resinous polymers in the manufacture of plastic laminates, coated fabrics and the like, relates to the bond developed between the polymeric material and the glass fiber surface. It has been found that unless a strong bonding relationship is capable of being established and retained, the contribution of strength by the glass fibers is considerably less than would otherwise be realized. Thus, a considerable amount of research and development has been expended in developing a material that may be applied to the surface of the glass fiber to (1) lubricate the surface and thereby prevent abrasion and (2) act as a bonding or anchoring agent between the glass surface and a polymeric material.

Glass fibers are substantially unlike natural fibers in that the latter offer the possibilities of either a strong physical bond or a strong chemical bond or both with resinous materials and do not readily rupture due to abrasion. With glass, however, it is difficult to establish a strong physical or chemical bond because the fibers are non-porous and have perfectly smooth surfaces such that there is nothing on to which the resinous materials can adhere. In addition, most natural or synthetic resinous fibers contain groupings on the surface which are more highly receptive to resinous materials than to water such that an anchorage can be established between the resinous materials and the organic or natural fibrous surfaces which are not disturbed by water. On the other hand, the groupings that predominate on the glass fibrous surfaces are hydrophilic in nature such that only a weak bond can be established in the first instance between the synthetic resinous or polymeric materials and the glass fibrous surfaces. Such bond as is capable of being initially established is substantially reduced by a film of water that preferentially forms between the resinous material and the glass fibrous surface in the presence of moisture or high humidity. Full utilization of the strength and of the desirable properties of the glass fibers in combination with organic polymeric materials has depended somewhat on increasing the bonding relationship between the glass fibrous surface and the organic polymeric material and the ability to retain the desired bonding relationship under moist or high humidity conditions.

Because of the nature of glass fibers, as noted above, it has been the practice in the art to first apply a size or surface lubricant to the glass fiber surfaces immediately after forming to enable the fibers to be further processed into strands, yarns and fabrics without destruction of the fibers by mutual abrasion. Thereafter, it has been necessary to remove the size from the glass fiber surfaces before application of a bonding agent. Difficulties arise in the application of the bonding agent directly to glass fibers in forming because it is, in itself, substantially incapable of the lubricity and bonding required for processing the fibers into strands or fabrics. The bonding agent is incapable further of providing proper protection of the glass fiber surfaces to prevent destruction by mutual abrasion. Thus, in commercial practice, a rather elaborate, time consuming and expensive operation is employed wherein the glass fibers are sized in forming, the sized glass fibers are processed into strands and woven into fabrics, the fabrics are washed or heat treated to remove the size and then the cleaned glass fibers are coated with the bonding agent. Such multiple operations not only make the process expensive and time consuming, but it has been found that the glass fibers are damaged to some extent during handling, while in an unprotected state, after the size has been removed.

Numerous attempts have been made to adapt a system wherein the bonding agent can be incorporated as a component in the size composition thereby to produce a size which has the desired processing characteristics for fabrication of the fibers into yarns and fabrics and the desired performance characteristics which will render the sized fibers more receptive to resinous or organic polymeric materials without the necessity of removing the size originally applied. While such combinations provide improvements by comparison with size compositions without a bonding agent, full benefit of the bonding agent is incapable of being achieved because of its dilution in the size composition such that only a small proportion of that present in the applied coating is effective for the intended purpose.

More recently, a number of systems capable of rendering glass fibrous surfaces more receptive to resinous and other organic polymeric materials and to enhance the bonding relationship between the glass fibrous surfaces and such polymeric materials have been developed. For the most part, such systems have been based upon the operation of a bonding agent having at least one group which is capable of strong and relatively permanent attachment to the surfaces of the glass fibers and one or more other groupings to which the resinous or polymeric materials are capable of attachment whereby the bonding agent is able to tie the resinous or polymeric materials on to the glass fibrous surfaces.

In U.S. Patent Number 2,552,910 of Dr. Steinman, there is illustrated one of the systems wherein use is made of a bonding agent in the form of a chromic (Werner) complex compound having a carboxylato group coordinated with the trivalent nuclear chromium atom in which the carboxylato group has less than six carbon atoms and contains a highly functional group. The chromic atom of the complex is believed capable of strong attachment to the glass fiber surfaces while the functional group of the short chained carboxylato radical is capable of effecting strong attachment with resinous or polymeric materials. In U.S. Patent Number 2,563,288, use was made of a bonding agent in the form of a silane, its hydrolysis products or its polymerization products having at least one of the organic groups attached to the silicon atom which contained less than seven carbon atoms and was formed with ethylenic unsaturation. The theory of operation is believed to reside in the ability of the silicon atom to become strongly attached to the silicon oxide groupings present on the surfaces of the glass fibers while the ethylenic group provides means for attachment of resinous or polymeric materials preferably formed by addition polymerization through ethylenic or acetylenic groupings in the monomer of which the polymer is formed.

It has now been unexpectedly found that polymeric quaternary ammonium halide derivatives of a polyphenylene oxide possess sufficient lubricity to prevent fiber abrasion and in addition serve as a strong and effective bonding material between the glass fibers and polymeric binders. In addition, it has been found that the bond existing between the polyphenylene oxide derivatives and the glass fiber surface is highly resistant to water and hence, the sized glass fibers are particularly well suited for these applications wherein high humidity or an aqueous media is encountered.

Accordingly, one object of this invention is to provide a polyphenylene oxide derivative suitable for surface treating glass fibers and the like.

Another object of this invention is to provide a sizing composition for glass fibers and the like that is highly resistant to high humidity and aqueous media and which further serves as a bonding material for polymeric binders.

A further object of this invention is to provide a process for treating glass fibers and the like with derivatives of polyphenylene oxides.

Other objects and advantages of this invention will be in part apparent and in part pointed out in the description which follows.

In general, the objects and advantages of this invention are achieved by surface treating glass fibers with a quaternary ammonium halide derivative of a polyphenylene oxide. The polyphenylene oxides are described and claimed in U.S. Patents Nos. 3,306,873 and 3,306,875 incorporated herein by reference. These materials have a repeating structural unit of the formula:

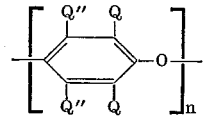

wherein the oxygen atom of one unit is connected to the benzene nucleus of the adjoining unit, $n$ is a positive integer and is at least 100. Q is a monovalent substituent selected from the group consisting of hydrogen, hydrocarbon radicals, phenol. Other interesting polymers include those derived from 2-methyl-6-ethylphenol and ortho cresol.

The derivatives useful for the sizing of glass fibers in accordance with the present invention are those derived from polyphenylene oxide having quaternary ammonium halide substitution on either the aryl nucleus or on a methyl group attached to the aryl nucleus. These materials may be represented by the following general formulae:

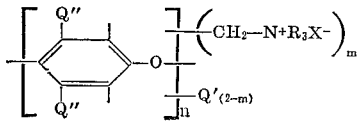

and

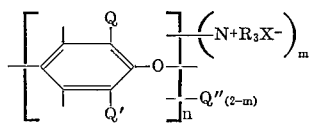

wherein Q, Q' and Q" are as defined above; R is an alkyl radical having from one to four carbon atoms; X is a halide, i.e., chlorine, bromine or iodine; $m$ is a number ranging between 0.1 and 2; and $n$ is a whole number of at least 100.

The manner of forming the polymeric quaternary ammonium halide derivatives wherein substitution takes place on the methyl group is disclosed in copending U.S. patent application Serial Number 155,829 of Allan S. Hay filed Nov. 29, 1961, and now issued at U.S. Patent 3,378,505 and incorporated herein by reference. To prepare the quaternary ammonium halide derivative, it is necessary to begin with a halomethyl derivative of a polyphenylene oxide. The corresponding methyl substituted polyphenylene oxide is dissolved in a suitable solvent, preferably one which would be inert to the halogenating agent, such as a halogenated hydrocarbon, and thereafter reacted with a brominating or chlorinating agent which may be the free elemental halogen, e.g., chlorine or bromine, or a halogenating agent, for example, sulfuric chloride, sulfuric bromide, bromosuccinimide, etc. The reaction may be carried out at atmospheric, sub-atmospheric or super-atmospheric pressure, at, below or above ambient temperature. Generally, it is preferred to use atmospheric pressure and a temperature from ambient up to that obtained by refluxing the reaction mixture. The halogenating reaction may be hastened by means of exposure of the solution to actinic radiation, e.g., light from an ultaviolet lamp. If a liquid halogenating agent is being used, enough is substituted to give the desired mono-, di-, or tri-halosubstituted methyl groups on the polymer chain. If a gaseous halogenating agent is used, enough is passed into the reaction mixture until the amount absorbed is sufficient to give the desired degree of halogenation of the methyl groups. In general, the preponderance of the methyl groups will be monohalogenated before a second halogen is introduced and dihalogenated before a third halogen is introduced into a significant number of the methyl groups. The halogenated polymer is recovered by pouring the solution into a large volume of a liquid which will precipitate the polymer but which will dissolve the balance of the reaction mixture. A convenient solvent for this is methanol. The product may be dissolved and reprecipitated as many times as desired to obtain the desired degree of purification.

The halomethyl groups on the polyphenylene oxides are very reactive and will react with tertiary amines to form the corresponding quarternary ammonium halide. Details for carrying out the reaction as well as typical amines that may be employed to form the quaternary amine derivatives are set forth in the above referenced Hay patent application.

A similar process for forming polyphenylene oxides having nuclear, quaternary ammonium halide substitution is set forth in U.S. Patent No. 3,226,361 incorporated herein by reference. To form the quaternary ammonium halide, it is necessary to alkylate a polyphenylene oxide having nuclear amino substitution.

The glass fibers are treated with the quaternary ammonium halide by a process which includes the steps of (1) coating the fibrous material by immersing it in a solution of the quaternary ammonium halide; (2) removing and drying the fibrous material; (3) subjecting the dried fibrous glass to a hot water treatment; and (4) removing the water from the coating on the fibrous glass.

The solution with which the glass fibers are coated should contain from about 1 to 25 percent, by weight, of the quaternary ammonium halide. Any solvent may be employed provided it is non-reactive with both the glass fibers and the polymer. Preferred solvents include, but are not limited to methyl ethyl ketone, tetrahydrofuran and mixtures thereof. Drying of the fibers after removal from the solution may take place in air at ambient or elevated temperatures.

Following the drying step, the coated glass fibrous material is immersed in hot water. The water temperature should be at least 140° F. and preferably between 150° F. and 210° F. It has been found that this hot water treatment greatly increases the tenaciousness of the bond between the quaternary ammonium derivative and the surface of the glass fiber. The reason for this is not fully understood but the result is highly unexpected as water is conventionally used as a release agent for polymer films on glass surfaces. Following the treatment with hot water, the glass fibers are again dried in air at ambient or elevated temperatures.

It has been found that the quaternary ammonium coating should constitute from about 0.1 to 1.0 percent, by weight, of the glass fibers. However, concentrations in excess of 0.3 percent give best results and accordingly, 0.3 to 1.0 percent constitute a preferred range.

The following specific examples are intended for purposes of illustration and not limitation. All percentages expressed in the examples are by weight unless otherwise stated.

EXAMPLE 1

A solution was prepared by dissolving 5 parts by weight of a trimethylamine derivative of an alkyl halogenated poly - (2,6 - dimethyl - 1,4 - phenylene - oxide) in 95 parts of a 50–50 mixture of methanol and tetrahydrofuran. The polyphenylene oxide derivative contained 1.8 milliequivalents of the trimethylamine per gram of polymer. The trimethylamine group was substituted on the methyl group attached to the aromatic nucleus. A heat cleaned glass fabric identified as Style 181 obtained from J. P. Stevens was treated by dipping the fabric into the polymer solution and removing excess solution by placing the fabric between blotters and squeezing. The glass fabric pieces were then squeezed under a 20 pound roll and allowed to dry overnight (approximately 16 hours) by hanging at room temperature. The air dried samples were then rinsed 7 minutes in hot water (80° C.) and placed between blotters, squeezed, rolled at 20 pounds pressure and dried again at room temperature. The samples contained approximately 0.845 percent dry polymer. They were off-color, slightly stiff and had an amine odor.

EXAMPLE 2

The procedure of Example 1 was repeated but the solution employed in Example 1 was diluted with 2 parts by volume distilled water. The concentration of the polymer in solution was approximately 1.7 percent. After treating the glass fabric in a manner described in Example 1, the concentration of polymer on the glass fabric was found to be approximately 0.29 percent. The sample of fabric was soft and not discolored by the polymer. A faint amine odor was evident.

EXAMPLE 3

Using the surface treated glass fabric of Examples 1 and 2, strips were cut 1½" wide and 6" long and measured for wet flexural endurance. The test consisted of mechanically flexing the fabric across a freely rotating ⅛" diameter rod under water while under a tensile load of 1375 gms. The number of flexes required to completely separate the cloth because of failure of the warp or machine threads was the measure of flexural endurance. The sample containing 0.29 percent size withstood approximately an average of 729 flexes. That sample containing 0.85 percent size withstood an average of 1210 flexes. This compares with 63 flexes for an untreated glass fabric.

What we claim as new and desire to secure by Letters Patent of the United States is:

1. A method for sizing glass fibers which comprises the steps of:
   (a) coating glass fibers by immersing them in a solution of up to 25% by weight of a sizing compound having the general formula selected from the group consisting of:

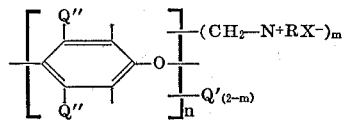

and

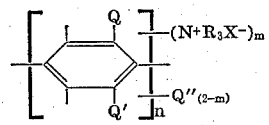

wherein the oxygen atom of one unit is connected to the benzene nucleus of the next adjoining unit; Q is a monovalent substituent selected from the group consisting of hydrogen, hydrocarbon radicals, hydrocarbonoxy radicals, halohydrocarbon radicals having at least two carbon atoms between the halogen atom and phenol nucleus and halohydrocarbonoxy radicals having at least two carbon atoms between the halogen atom and phenol nucleus; Q' and Q" are the same as Q and in addition halogen; R is a member selected from the group consisting of alkyl having from 1 to 4 carbon atoms; X is a halide; $m$ is a number ranging between 0.01 and 2.00; and $n$ is a whole number of at least 100;
   (b) removing said coated glass fibers from said solution and drying;
   (c) immersing said dried, coated glass fibers in hot water maintained at least 140° F.; and
   (d) removing said coated glass fibers from said hot water and drying.

2. The process of claim 1 wherein the size has the general formula:

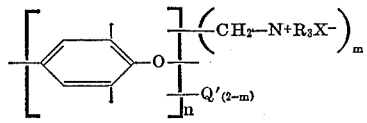

and Q' and R are methyl.

3. The process of claim 1 wherein the size has the general formula:

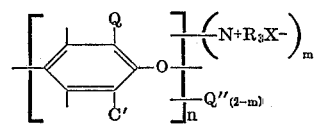

and Q, Q' and R are methyl and Q" is hydrogen.

4. The process of claim 1 wherein the concentration of the size in solution ranges from approximately 1 to 25 percent, by weight.

5. The process of claim 1 wherein the solvent for the size is a member selected from the group consisting of methyl ethyl ketone, tetrahydrofurane, and mixtures thereof.

6. The process of claim 5 wherein the water temperature is maintained at between 150° F. and 210° F.

7. In a fibrous glass material impregnated with an organic plastic binder, the improvement comprising a sizing compound intermediate between the fibrous glass and the plastic binder, said sizing compound having a general formula selected from the group consisting of

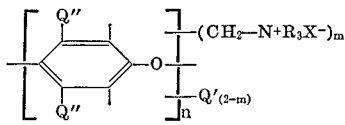

and

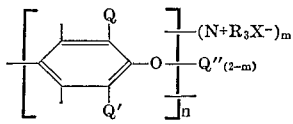

wherein the oxygen ether atom of one unit is connected to the benzene nucleus of the next adjoining unit; Q is a monovalent substituent selected from the group consisting of hydrocarbon radicals, hydrocarbonoxy radicals, halohydrocarbon radicals having at least two carbon atoms between the halogen atom and the phenol nucleus, and halohydrocarbonoxy radicals having at least two carbon atoms between the halogen atom and phenol nucleus; Q' and Q'' are the same as Q and in addition halogen; R is a member selected from the group consisting of alkyl having from 1 to 4 carbon atoms; X is a halide; $m$ is a number ranging between 0.01 and 2.00; and $n$ is a whole number of at least 100.

8. The product of claim 7 where the sizing compound has the general formula

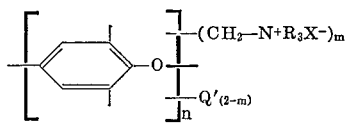

and Q' and R are methyl.

9. The product of claim 7 where the sizing compound has the general formula

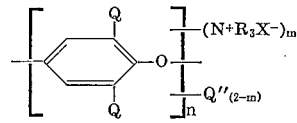

and Q, Q' and R are methyl and Q'' is hydrogen.

References Cited

UNITED STATES PATENTS 3,259,520   7/1966   Borman.

DAVID KLEIN, Primary Examiner

U.S. Cl. X.R.

65—3; 260—47